United States Patent
Reese et al.

(10) Patent No.: US 12,225,897 B2
(45) Date of Patent: Feb. 18, 2025

(54) ANIMAL REPELLENT PRODUCTS, REPELLENT COMPOSITIONS AND METHODS OF MANUFACTURING THE SAME

(71) Applicant: Olson Products, Inc., Medina, OH (US)

(72) Inventors: Dennis Franklin Reese, Medina, OH (US); Earle Louis Olson, Medina, OH (US)

(73) Assignee: Olson Products, Inc., Medina, OH (US)

( * ) Notice: Subject to any disclaimer, the term of this patent is extended or adjusted under 35 U.S.C. 154(b) by 775 days.

(21) Appl. No.: 17/399,305

(22) Filed: Aug. 11, 2021

(65) Prior Publication Data

US 2022/0220763 A1 Jul. 14, 2022

Related U.S. Application Data

(60) Provisional application No. 63/136,446, filed on Jan. 12, 2021.

(51) Int. Cl.
*A01M 29/12* (2011.01)
*A01N 25/34* (2006.01)
*A01N 63/10* (2020.01)
*A01P 17/00* (2006.01)

(52) U.S. Cl.
CPC ............. *A01M 29/12* (2013.01); *A01N 25/34* (2013.01); *A01N 63/10* (2020.01); *A01P 17/00* (2021.08)

(58) Field of Classification Search
CPC ....... A01M 29/12; A01N 25/34; A01N 63/10; A01P 17/00
See application file for complete search history.

(56) References Cited

U.S. PATENT DOCUMENTS

| | | | |
|---|---|---|---|
| 5,142,817 A | 9/1992 | Rolf | |
| 6,395,290 B2 | 5/2002 | Brown | |
| 6,652,870 B2 | 11/2003 | Campbell et al. | |
| 2004/0151750 A1* | 8/2004 | O' Leary | A01N 65/00 424/405 |
| 2011/0177149 A1* | 7/2011 | Messina | A01N 65/00 424/409 |
| 2013/0156839 A1 | 6/2013 | Messina et al. | |
| 2018/0235160 A1 | 8/2018 | Krouse | |

FOREIGN PATENT DOCUMENTS

JP H0710703 * 1/1995

OTHER PUBLICATIONS

Messina wildlife dbr100 Deer Stopper 100' barrier ribbon, 4.8 oz., organic, red, Newegg.com, retrieved from https://www.newegg.com/p/07A-004Y-00066 on Nov. 10, 2020 (3 pages).

* cited by examiner

*Primary Examiner* — Shirley V Gembeh
(74) *Attorney, Agent, or Firm* — Benesch Friedlander Coplan & Aronoff LLP

(57) ABSTRACT

Animal repellent products may include a substrate in a physical form being one of: a ribbon, a string, a rope, a wire, individual sheets, tiles or any appropriate material. The substrate is pre-coated with a granular repellent substance. A first layer of non-drying temperature sensitive adhesive is coated over an entire or partial exposed surface of the substrate; wherein the non-drying temperature sensitive adhesive retains its adhesive characteristics without fully drying for an indefinite time period after prolonged exposure to sunlight and water in an outdoor environment. A second layer of granular repellent is coated over the first layer of non-drying temperature sensitive adhesive, wherein the granular repellent substance retains its chemical and physical characteristics for an indefinite time period after prolonged exposure to the sunlight and water in the outdoor environment, by giving off a repulsive scent to approaching animals and the granular repellent substance is water insoluble.

20 Claims, 3 Drawing Sheets

ANIMAL REPELLENT PRODUCTS, REPELLENT COMPOSITIONS AND METHODS OF MANUFACTURING THE SAME

CROSS REFERENCED TO RELATED APPLICATION

This application claims priority to and the benefit from U.S. Provisional Patent Application Ser. No. 63/136,446 titled "ANIMAL REPELLENT PRODUCTS, REPELLENT COMPOSITIONS AND METHODS OF MANUFACTURING THE SAME", filed on Jan. 12, 2021, the contents of which are herein incorporated by reference in their entirety.

FIELD OF INVENTION

The present disclosure relates to animal repellent products, compositions and methods of manufacturing the same.

BACKGROUND

The animal repellent products found in a prior search discloses either a repellent composition being topically applied on the ground or on different objects' external surfaces, or being encapsulated within plastic bubbles (e.g., US 208235160A1) to be released when pierced by animals. In addition, repellent composition may be applied in a form of oil which may be washed off by rain water, thus requiring repeated applications to maintain its repelling efficacy.

SUMMARY

The present application discloses animal repellent products that may deter and repel deer or other animals from trespassing or eating foliage in a vegetable or floral garden, fruit farms or crops grown in a fenced boundary. In an example, an animal repellent product may include a substrate having a physical form being one of: a ribbon, a string, a rope, a wire, individual sheets and tiles. An entire or a portion of an exposed surface of the substrate may be coated with a first layer of non-drying temperature sensitive adhesive, wherein the non-drying temperature sensitive adhesive may retain its adhesive characteristics without fully drying for an indefinite time period after prolonged exposure to sunlight and water in an outdoor environment. A second layer of granular repellent substance may be coated over the first layer of non-drying temperature sensitive adhesive, wherein the granular repellent substance retains its chemical and physical characteristics for the indefinite time period after prolonged exposure to the sunlight and water in the outdoor environment, by giving off a repulsive scent to approaching animals and is water insoluble.

In another example, a method for manufacturing an animal repellent product may include carrying out at least the steps including: (1) providing a substrate having a physical form being one of: a ribbon, a string, a rope, a wire, individual sheets, tiles or any other appropriate material; (2) coating a first layer of non-drying temperature sensitive adhesive over the surface of the substrate, wherein the non-drying temperature sensitive adhesive retains its adhesive characteristics without fully drying for an indefinite time period after prolonged exposure to sunlight and water in an outdoor environment; and (3) depositing a second layer of granular repellent substance over the first layer of non-drying temperature sensitive adhesive, wherein the granular repellent substance retains its chemical and physical characteristics for an indefinite time period after prolonged exposure to the sunlight and water in the outdoor environment, by giving off a repulsive scent to approaching animals and is water insoluble.

In another example, a repellent product to keep out animals may include: a substrate having an entire or partial exposed surface coated with a non-drying temperature sensitive adhesive blended with granular repellent substance, wherein the substrate itself having a physical form being one of: a ribbon, a string, a rope, a wire, individual sheets, and tiles, wherein the non-drying temperature sensitive adhesive retains its adhesive characteristics without fully drying for an indefinite time period after prolonged exposure to sunlight and water in an outdoor environment; and the granular repellent substance retains its chemical and physical characteristics for an indefinite time period after prolonged exposure to the sunlight and water in the outdoor environment, by giving off a repulsive scent to approaching animals and is water insoluble.

BRIEF DESCRIPTION OF DRAWINGS

The disclosure is better understood with reference to the following drawings and description. The elements in the figures may not necessarily be to scale, emphasis are instead being placed upon illustrating the principles of the disclosure. Moreover, in the figures, like-referenced numerals may designate to corresponding parts throughout the different views.

DESCRIPTION

The present disclosure relates to animal repellent products, compositions and methods of manufacturing the same. Specifically, the animal repellent products may be used to repel vegetation eating animals, such as deer, rabbits, goats, sheep, possums, hogs and rodents from approaching a scent guard formed by the animal repellent products.

Figure 1:
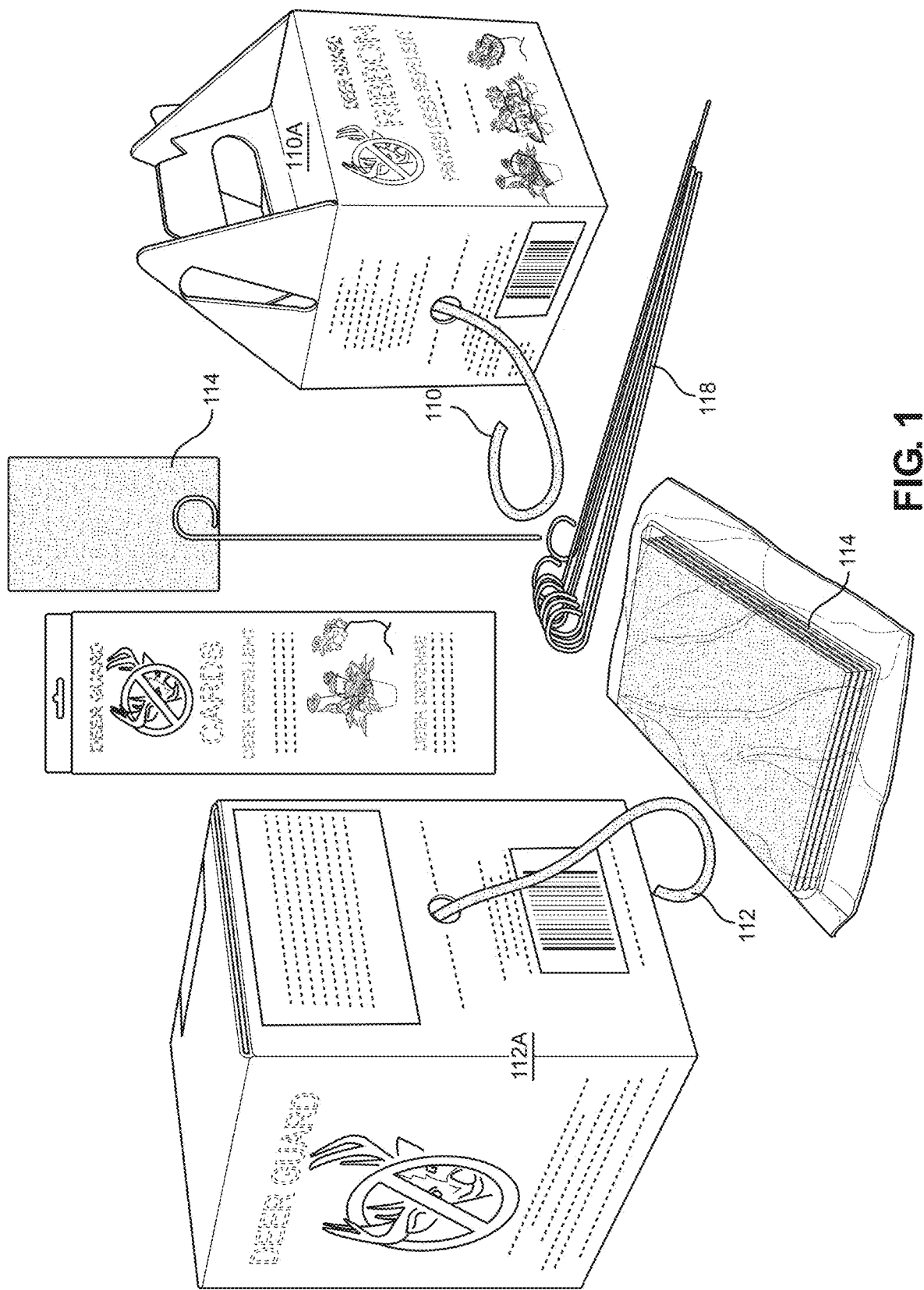
FIG. 1 illustrates various embodiments of animal repellent products.

FIG. 1 illustrates various embodiments of animal repellent products. As shown in FIG. 1, the two products 110, 112 may come in a cord or a ribbon form to be placed on plants shrubs or hung from trees. Both may come in an easy-to-use dispenser 110A, 112A. A third product may include cards (sheets or tiles) 114 that are inserted into wire holders and then stuck in the ground, pots or hung from trees and shrubs, or any man-made structures, such as a guard fence, a rail, a ranch fold, a cage, a mesh, a barrier, a pole, a stick 118, and a tool, or in combination with any objects in the natural environment.

Figure 2A:
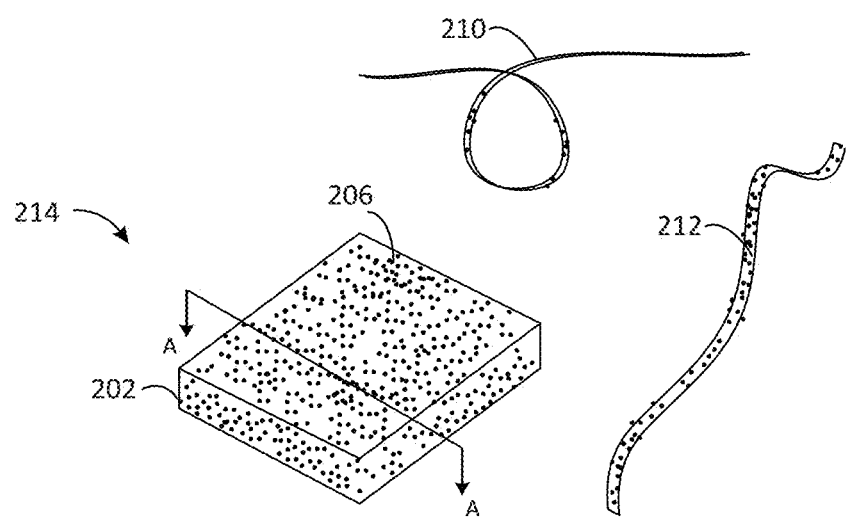
FIG. 2A illustrates granular repellent substance pre-coated on various embodiments of animal repellent products.

FIG. 2A illustrates granular repellent substance pre-coated on various embodiments of animal repellent products 210, 212, 214. Each of the animal repellent products 210, 212, 214 may each be constructed with a starting substrate 202 having a physical form being one of: a ribbon 212, a string 210, a rope, a wire, individual sheets 202 and tiles, etc. The substrate 202 surfaces (i.e., exposed surfaces from all sides) may be entirely or partially coated with a granular repellent substance 206.

Figure 2B:
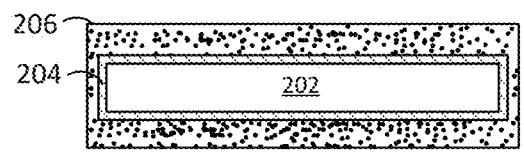
FIG. 2B illustrates a cross section view of an exemplary pre-coating for an animal repellent product.
Figure 3:
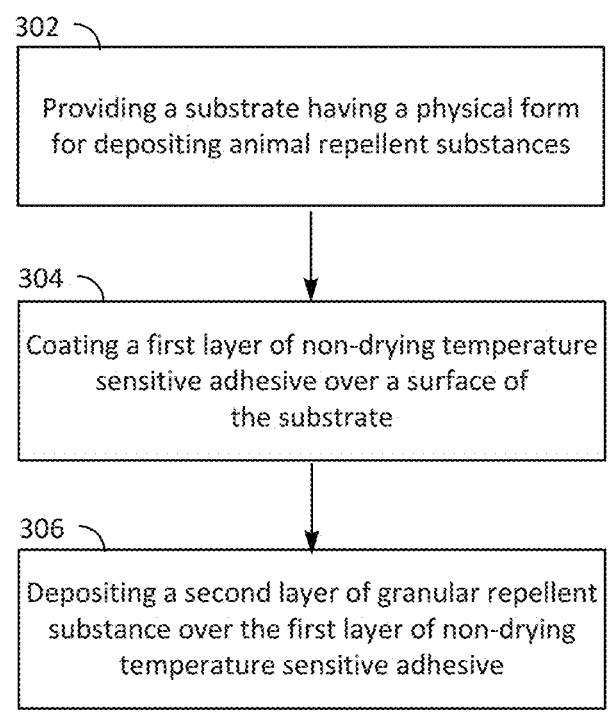
FIG. 3 illustrates an example of a method for manufacturing an animal repellent product.

FIG. 2B illustrates a cross section view A-A of an exemplary pre-coating for an animal repellent product as shown in FIG. 2B. The cross section view A-A also illustrates a pre-coating method of the granular repellent substance over a sheet or a tile form substrate 202.

As shown in FIG. 2B, a first layer of non-drying temperature sensitive adhesive 204 may be first coated over an exposed surface of the substrate 202. In implementation, the exposed area may be an entire or partial surface area. The non-drying adhesive 204 may retain its adhesive characteristics without fully drying for an indefinite period after prolonged exposure to sunlight and water in an outdoor environment. A second layer of granular repellent substance 206 may be afterwards pre-coated over the first layer of non-drying adhesive 204. The second layer of granular repellent substance 206 may have been experimentally tested to show that its chemical and physical characteristics may be retained for an exceedingly long period of time (i.e., >10 years) to be considered a relative indefinite time period after deployment, in an outdoor environment under prolonged exposure to the sunlight and rain water or not easily dissolved after prolonged immersion in water.

In implementation, the repelling efficacy is derived from the repulsive scent given off by the granular repellent substance 206 to approaching animals. Its effectiveness is due to the large surface areas of the granular repellent substance 206 that gives off the repulsive scent.

In addition, the granular repellent substance 206 has been experimentally tested to maintain its insolubility to water and without losing its efficacy to repel animals after a prolonged exposure to sunlight and rainwater in an outdoor ambient environment.

In an example, the first layer of non-drying adhesive 204 may include a mixture of ultra violet (UV) light stable polymers and oils, formed by at least two or more of: Isobutene polymer, Butene-homopolymer, Isobutylene resin, Polybutene, Polymerized 2-Methylpropene, 2 Methyl 1-1-Propene homopolymer, hydrogenated Castor oil, wax and mineral spirits. In implementation, the mixture of UV light stable polymers and oils may be heated to between 120 to 180 degrees Fahrenheit and coated on to the substrate. In an example, the mixture of ultra violet (UV) light stable polymers and oils that forms the non-drying adhesive and may retain its adhesive physical characteristics without fully drying.

In an example, the granular repellent substance 206 that are coated over the first layer 204 of non-drying adhesive may include at least one or more of: feather meal, by products from slaughtered animals, decomposed eggs, urine, fertilizer, blood feed, and animal pheromones, wherein the granular repellent substance may be directly deposited over the first layer 204 of non-drying adhesive at an ambient temperature between 50 to 150 degrees Fahrenheit.

Referring to FIG. 2A, the repellent product 210, 212 may be wound as a spool into a roll, when supplied in a physical form of the ribbon, the string, the rope or the wire. The roll of repellent product 210, 212 may be dispensed through an opening of a packaging box as shown in FIG. 1, which the repellent product 210, 212 may be used to wrap or wind over a man-made structure or natural environmental objects to form a scent guard fence or a boundary to repel the approaching animals from trespassing. The substrate 202 in the ribbon or string form may be fabricated from one or a combination of: polystyrene, polypropylene, nylon, woven fabrics, stranded jute, stranded wires or any other appropriate substrate.

In an example, if the substrate is supplied in the physical form of the ribbon, the substrate may be fabricated in dimensions no wider than 1" and no thicker than $\frac{1}{16}$". The ribbon form of the repellent product 210, 212 is not limited in its physical dimensions for practical applications. In an example, if the substrate is supplied in the physical form of the string, the rope or the wire, the substrate may have a diameter under $\frac{1}{4}$".

The pre-coated repellent product 210, 212 in the physical form of the individual sheets or tiles may be configured to be individually hung, affixed to a man-made structure or a natural environmental object, or directly staked into the earth to form a scent guard fence to repel the trespassing animals from destroying or eating the plants, wherein the structure of objects may include a man-made structure or natural landscape, wherein the man-made structure includes anyone of: a guard fence, a ranch fold, a cage, a mesh, a barrier, a pole, a stick 118, and a tool, wherein the natural landscape comprising trees, shrubs, soil and rock.

As shown in FIG. 2A the substrate 202 in the physical form of the individual sheets or tiles 214 may be fabricated from one or a combination of: polystyrene, polypropylene, nylon, plastic, composites, metal, wood, cellulose, laminates recycled materials or any other appropriate material. The individual sheets or tiles 214 form of substrate 202 may be fabricated in shapes including: squares, rectangles, polygons, oval, circles and any irregular shapes.

In another embodiment, the individual sheets or tiles 214 form of substrate 202 may be fabricated from one or a combination of: organic polymers, metals, wood, or biodegradable materials, such as recycled laminates or papers, or cellulose based materials that may break down when deployed outdoor after certain number of months or years.

As shown in FIG. 1, the repellent products 110, 112 may come in a ribbon form to be placed on plants shrubs or hung from trees. Both may come in an easy-to-use dispenser 110A, 112A. Other repellent product may include several plastic cards 114 that may be inserted into holders and then stuck in the ground, pots or hung from trees and shrubs.

A method for manufacturing an animal repellent product 210, 212, 214 may include: in step 302, providing a substrate 202 having a physical form being one of: a ribbon, a string, a rope, a wire, individual sheets and tiles. The substrate 202 may go through the pre-coating steps including step 304: coating a first layer of non-drying thermally sensitive adhesive 204 over an entire or partial exposed surface of the substrate 202; wherein the non-drying thermally sensitive adhesive retains its adhesive characteristics without drying for an indefinite time period after prolonged exposure to sunlight and water in an outdoor environment. In step 306, depositing a second layer of granular repellent substance 206 over the first layer of non-drying temperature sensitive adhesive 204. The granular repellent substance 206 may retain its chemical and physical characteristics for an indefinite time period after prolonged exposure to the sunlight and water in the outdoor environment, by giving off a repulsive scent to approaching animals and the second layer of granular repellent substance 206 is water insoluble or not easily dissolved after prolonged immersion in water.

In another embodiment, a repellent product to keep out animals includes: a substrate 202 having an entire or partial exposed surface coated with a non-drying temperature sensitive adhesive 204 coated with granular repellent substance 206, wherein the substrate 202 itself having a physical form being one of: a ribbon 210, a string, a rope, a wire 212, individual sheets, and tiles 214. The non-drying temperature sensitive adhesive 204 may retain its adhesive characteristics without fully drying for an indefinite time period after prolonged exposure to sunlight and water in an outdoor environment; and the granular repellent substance 206 may retain its chemical and physical characteristics for an indefinite time period after prolonged exposure to the sunlight and water in the outdoor environment, by giving off a repulsive scent to approaching animals and is water insoluble or not easily dissolved after prolonged immersion in water.

It will be appreciated that the terminology used in the present application is for the purpose of describing particular embodiments and is not intended to limit the application. The singular forms "a", "the", and "the" may be intended to comprise a plurality of elements. The terms "including" and "comprising" are intended to include a non-exclusive inclusion. Although the present application is described in detail with reference to the foregoing embodiments, it will be appreciated that those foregoing embodiments may be modified, and such modifications do not deviate from the scope of the present application.

Details of the disclosure may be found in the recited claims below.

The invention claimed is:

1. A repellent product to keep out animals, comprising:
   a substrate having a physical form being one of: a ribbon, a string, a rope, a wire, individual sheets and tiles for depositing animal repellent substances;
   a first layer of non-drying temperature sensitive adhesive coated over all or a portion of an entire exposed surface of the substrate; wherein the non-drying temperature sensitive adhesive retains its adhesive characteristics without fully drying for an indefinite time period after prolonged exposure to sunlight and water in an outdoor environment, wherein the first layer of non-drying temperature sensitive adhesive comprises a mixture of ultra violet (UV) light stable polymers and oils, the mixture comprising at least two or more of: Isobutylene resin, Polymerized 2-Methylpropene, 2 Methyl 1-1-Propene homopolymer, hydrogenated Castor oil, wax and mineral spirits; and
   a second layer of granular repellent substance coated over the first layer of non-drying temperature sensitive adhesive, wherein the granular repellent substance is exposing to an ambient environment and retains its chemical and physical characteristics for the indefinite time period after prolonged exposure to the sunlight and water in the outdoor environment, by giving off a repulsive scent to approaching animals and is water insoluble.

2. The repellent product according to claim 1, wherein the mixture further comprises at least one of: Isobutene polymer, Butene-homopolymer, and Polybutene.

3. The repellent product according to claim 1, wherein the second layer of granular repellent substance feather meal and at least one of: byproducts from slaughtered animals, decomposed eggs, urine, fertilizer, blood feed, and animal pheromones.

4. The repellent product according to claim 1, if the substrate is supplied in the physical form of the ribbon, the string, the rope or the wire are wound as a spool, the repellent product is configured to be dispensed through an opening of a packaging box, and configured to wrap or wind over a structure or objects to form a scent guard fence or boundary to repel the approaching animals from trespassing.

5. The repellent product according to claim 4, if the substrate is supplied in the physical form of the ribbon, the string, the rope or the wire, the substrate is fabricated from one or a combination of: polystyrene, polypropylene, nylon, woven fabrics, stranded jute, stranded wires or any appropriate material.

6. The repellent product according to claim 5, wherein: if the substrate is supplied in the physical form of the ribbon, the substrate is fabricated in dimensions no wider than 1" and no thicker than 1/16", if the substrate is supplied in the physical form of the string, the rope or the wire, the substrate has a diameter under 1/4".

7. The repellent product according to claim 1, if the substrate is supplied in the physical form of the individual sheets or tiles, is configured to be individually hung, affixed to a structure or an object, or directly staked into the earth to form a guard fence or boundary to repel the approaching animals from trespassing.

8. The repellent product according to claim 7, if the substrate is supplied in the physical form of the individual sheets or tiles, the substrate is fabricated from one or a combination of: organic polymers, metals, wood, cellulose laminates and recycled materials or any appropriate material.

9. The repellent product according to claim 8, if the substrate is supplied in the physical form of the individual sheets or tiles, the substrate is fabricated in shapes comprising: squares, rectangles, polygons, oval, circles and irregular shapes.

10. The repellent product according to claim 1, wherein the approaching animals are vegetation eating wild animals comprising: deer, rabbits, goats, sheep, possums, hogs, rodents and others.

11. The repellent product according to claim 2, wherein the mixture of UV light stable polymers and oils is heated to between 120 to 180 degrees Fahrenheit and coated on to the substrate.

12. The repellent product according to claim 11, wherein the granular repellent substance is directly deposited over the first layer of non-drying adhesive at an ambient temperature between 50-150 degrees Fahrenheit.

13. The repellent product according to claim 4, wherein the structure of objects comprising a man-made structure or natural landscape, wherein the man-made structure comprising anyone of: a guard fence, a ranch fold, a cage, a mesh, a barrier, a pole, a stick, and a tool, wherein the natural landscape comprising trees, shrubs, soil and rock.

14. The repellent product according to claim 7, wherein the structure of objects comprising a man-made structure or natural landscape, wherein the man-made structure comprising anyone of: a guard fence, a ranch fold, a cage, a mesh, a barrier, a pole, a stick, and a tool, wherein the natural landscape comprising trees, shrubs, soil and rocks.

15. A method for manufacturing an animal repellent product, the method comprising:
   providing, a substrate having a physical form being one of: a ribbon, a string, a rope, a wire, individual sheets, tiles or any other appropriate material, for depositing animal repellent substances;
   coating a first layer of non-drying temperature sensitive adhesive over a surface of the substrate, wherein the non-drying temperature sensitive adhesive retains its adhesive characteristics without fully drying for an indefinite time period after prolonged exposure to sunlight and water in an outdoor environment, wherein the first layer of non-drying temperature sensitive adhesive comprises a mixture of ultra violet (UV) light stable polymers and oils, the mixture comprising at least two or more of: Isobutylene resin, Polymerized 2-Methylpropene, 2 Methyl 1-1-Propene homopolymer, hydrogenated Castor oil, wax and mineral spirits; and depositing a second layer of granular repellent substance over the first layer of non-drying temperature sensitive adhesive, wherein the granular repellent substance is exposing to an ambient environment and retains its chemical and physical characteristics for an indefinite time period after prolonged exposure to the sunlight and water in the outdoor environment, by giving off a repulsive scent to approaching animals and is water insoluble.

16. The method according to claim 15, wherein the mixture further comprises at least one of: Isobutene polymer, Butene-homopolymer, and Polybutene.

17. The method according to claim 15, wherein the second layer of granular repellent substance comprises feather meal and at least one of: byproducts from slaughtered animals, decomposed eggs, urine, fertilizer, blood feed, and animal pheromones.

18. A repellent product to keep out animals, comprising:
a substrate having an entire or partial exposed surface coated with a non-drying temperature sensitive adhesive blended with granular repellent substance, wherein the substrate itself having a physical form being one of: a ribbon, a string, a rope, a wire, individual sheets, and tiles, wherein the non-drying temperature sensitive adhesive retains its adhesive characteristics without fully drying for an indefinite time period after prolonged exposure to sunlight and water in an outdoor environment, wherein the non-drying temperature sensitive adhesive comprises a mixture of ultra violet (UV) light stable polymers and oils, the mixture comprising at least two or more of: Isobutylene resin, Polymerized 2-Methylpropene, 2 Methyl 1-1-Propene homopolymer, hydrogenated Castor oil, wax and mineral spirits; and the granular repellent substance is exposing to an ambient environment and retains its chemical and physical characteristics for an indefinite time period after prolonged exposure to the sunlight and water in the outdoor environment, by giving off a repulsive scent to approaching animals and is water insoluble.

19. The repellent product according to claim 18, wherein the mixture further comprises at least one of: Isobutene polymer, Butene-homopolymer, and Polybutene.

20. The repellent product according to claim 18, wherein the granular repellent substance comprises feather meal and at least one of: byproducts from slaughtered animals, decomposed eggs, urine, fertilizer, blood feed, and animal pheromones.

* * * * *